(12) United States Patent
Do et al.

(10) Patent No.: US 10,232,377 B2
(45) Date of Patent: Mar. 19, 2019

(54) PROCESS OF DRY MILLING PARTICULATE MATERIALS

(71) Applicant: XG SCIENCES, INC., Lansing, MI (US)

(72) Inventors: Inhwan Do, East Lansing, MI (US);
Michael Knox, East Lansing, MI (US);
Scott Murray, East Lansing, MI (US);
Robert M. Privette, East Lansing, MI (US)

(73) Assignee: XG SCIENCES, INC., Lansing, MI (US)

( * ) Notice: Subject to any disclaimer, the term of this patent is extended or adjusted under 35 U.S.C. 154(b) by 0 days.

(21) Appl. No.: 15/155,158

(22) Filed: May 16, 2016

(65) Prior Publication Data

US 2016/0256873 A1 Sep. 8, 2016

Related U.S. Application Data

(63) Continuation-in-part of application No. 13/474,860, filed on May 18, 2012, now abandoned.

(51) Int. Cl.
*C23C 24/00* (2006.01)
*C23C 8/00* (2006.01)
(Continued)

(52) U.S. Cl.
CPC .......... *B02C 17/20* (2013.01); *C04B 35/6261* (2013.01); *C09D 1/00* (2013.01); *H01B 1/04* (2013.01); *H01G 11/46* (2013.01); *H01G 11/86* (2013.01); *H01M 4/04* (2013.01); *H01M 4/364* (2013.01); *H01M 4/38* (2013.01); *H01M 4/386* (2013.01); *H01M 4/48* (2013.01); *H01M 4/587* (2013.01); *H01M 4/622* (2013.01); *B82Y 30/00* (2013.01); *B82Y 40/00* (2013.01); *H01G 11/36* (2013.01); *H01M 4/13* (2013.01); *Y02E 60/13* (2013.01); *Y10T 428/2982* (2015.01)

(58) Field of Classification Search
CPC ....... C09C 1/46; C09C 3/041; C01P 2004/20; C01P 2004/60; B23C 2220/48; B23C 2222/00; B23C 2226/00; B23C 2226/27; B23C 2226/61; B23C 2228/00
USPC .............................. 427/201, 215; 241/22, 27
See application file for complete search history.

(56) References Cited

U.S. PATENT DOCUMENTS

| | | |
|---|---|---|
| 8,440,298 B2 | 5/2013 | Gane et al. |
| 2002/0134964 A1 | 9/2002 | Christian et al. |

(Continued)

FOREIGN PATENT DOCUMENTS

| | | |
|---|---|---|
| EP | 2275385 | 1/2011 |
| JP | H1145705 A | 2/1999 |

(Continued)

OTHER PUBLICATIONS

Dash et al., Preparation of graphene oxide by dry planetary ball milling process from natural graphite, RSC Adv., 2016, 6, 12657.*

(Continued)

*Primary Examiner* — Hoa (Holly) Le
(74) *Attorney, Agent, or Firm* — Avery N. Goldstein; Blue Filament Law PLLC

(57) ABSTRACT

Graphene platelet nano composites with metal or metal oxides. The coated and composited particles are useful as electrodes and for electrical applications.

14 Claims, 1 Drawing Sheet

(51) Int. Cl.

| | | |
|---|---|---|
| B02C 17/20 | (2006.01) | |
| C09D 1/00 | (2006.01) | |
| H01B 1/04 | (2006.01) | |
| H01M 4/36 | (2006.01) | |
| H01G 11/46 | (2013.01) | |
| H01G 11/86 | (2013.01) | |
| C04B 35/626 | (2006.01) | |
| H01M 4/04 | (2006.01) | |
| H01M 4/38 | (2006.01) | |
| H01M 4/48 | (2010.01) | |
| H01M 4/587 | (2010.01) | |
| H01M 4/62 | (2006.01) | |
| B82Y 30/00 | (2011.01) | |
| B82Y 40/00 | (2011.01) | |
| H01M 4/13 | (2010.01) | |
| H01G 11/36 | (2013.01) | |

(56) References Cited

U.S. PATENT DOCUMENTS

| | | |
|---|---|---|
| 2004/0137327 A1 | 7/2004 | Gross et al. |
| 2004/0150312 A1 | 8/2004 | McElrath et al. |
| 2005/0106098 A1 | 5/2005 | Tsang et al. |
| 2007/0077490 A1 | 4/2007 | Kim et al. |
| 2008/0145293 A1 | 6/2008 | Carberry et al. |
| 2009/0020734 A1 | 1/2009 | Jang et al. |
| 2009/0117467 A1 | 5/2009 | Zhamu et al. |
| 2010/0003530 A1* | 1/2010 | Ganguli ............... B82Y 25/00 428/457 |
| 2010/0081057 A1 | 4/2010 | Liu et al. |
| 2011/0111303 A1 | 5/2011 | Kung et al. |
| 2011/0311869 A1 | 12/2011 | Oh et al. |
| 2012/0220198 A1* | 8/2012 | Peukert ............... C01B 31/0423 451/28 |
| 2014/0370387 A1* | 12/2014 | Anguchamy ......... H01M 4/364 429/221 |

FOREIGN PATENT DOCUMENTS

| | | |
|---|---|---|
| JP | 2005503641 A | 2/2005 |
| JP | 2007290936 A | 11/2007 |
| JP | 2009521792 A | 6/2009 |
| JP | 2011503804 A | 1/2011 |
| JP | 2011517053 A | 5/2011 |
| WO | 2009127901 A1 | 10/2009 |
| WO | 2010036648 A1 | 4/2010 |

OTHER PUBLICATIONS

Chou et al, Preparation of graphite/nano-powder composite particles and applicability as carbon anode material in a lithium ion battery, Advanced Powder Technology 19 (2008) 383-396. (Year: 2008).*

He et al., Preparation and consolidation of alumina/graphene composite powders, Materials Transactions, vol. 50, No. 4 (2009) 749-751 (Year: 2009).*

International Search Report dated Aug. 12, 2013 for International Application No. PCT/US2013/038967 filed May 1, 2013.

Supplementary European Search Report dated Nov. 27, 2015 for European Application No. 13790097 filed May 1, 2013.

English Translation of Notification of Reasons for Refusal dated Jan. 20, 2017 for Japanese Application No. 2015-512666 filed May 1, 2013.

* cited by examiner

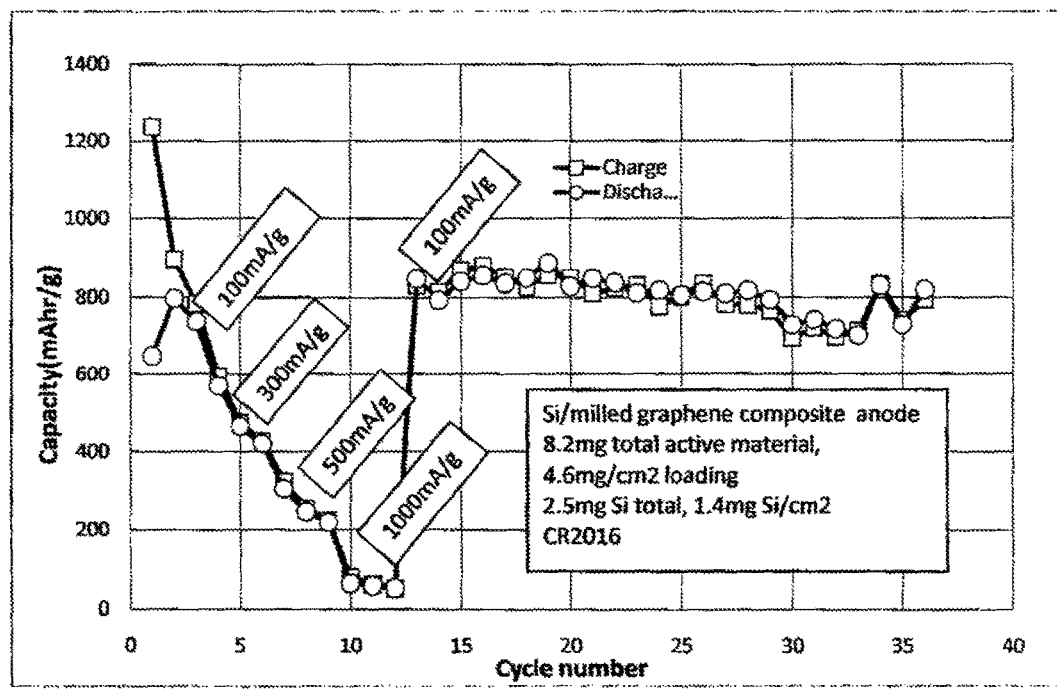

PROCESS OF DRY MILLING PARTICULATE MATERIALS

This application is a continuation-in-part application, of U.S. patent application Ser. No. 13/474,860, filed May 18, 2012, now pending, from which priority is claimed.

BACKGROUND OF THE INVENTION

This invention deals with graphene platelet nano composites with metal or metal oxide. The coated and composited particles are useful as electrodes and for electrical applications.

Graphite is formed by many layers of carbon in highly structured platelets. These platelets, when separated frost the graphite superstructure, are collectively called graphene. Graphene has interesting chemical, physical, and electrical properties. These properties make graphene a highly valued product. The quality of the graphene, as defined by particle diameter, particle width, and surface area, determine its industrial utility. It is advantageous to coat or composite graphene with metal particles for electrical applications.

Xg Sciences, inc. headquartered in Lansing, Mich. produces a "C" grade graphene by a high energy, plastic media, dry, mechanical milling process. Grade size characteristics make it uniquely suited to coating or mixing with nanoparticles to form useful materials for electrodes.

The applicant is aware of U.S. Patent publication 2011/0111303 A1 that published on May 12, 2011 as showing a wet process for treating graphene with silicon.

Also, the patentees are aware of EP2275385 in the name of Peukert, et al in which a wet process is set forth for grinding particulate materials, wherein the grinding media is yttrium stabilized zirconia.

SUMMARY OF THE INVENTION

Graphene produced for media ball milling has very small particle size with a relatively high surface area. It is uniquely suited to make nano-composites or coatings by coating or admixing other particles. Metals or metal oxides can be coated or formed into composites with the high surface area, relatively low aspect ratio graphene. It is believed by the inventors herein that the materials of this invention have unique aspect ratios. Ground graphite admixed with silicon has an aspect ratio fairly close to 1, graphene from a GO process, epitaxially grown graphene, or graphene from an intercalated heating process has a very high aspect ratio. The moderate aspect ratio graphene of this invention better coats 1 to 4 micron particles and better mixes with even small nano-particles.

Based on Raman spectroscopy with the intended aspect ratio, particle size, and/or surface area, provides graphene in this invention that is unique.

Calculated from Raman Spectroscopy, and measuring peak height, generated the following table.

| $m^2/g$ | G | D | G/D | Gpeak |
|---|---|---|---|---|
| 250 | 50 | 5 | 10 | 1580 |
| 400 | 19 | 6 | 3.2 | |
| 500 | 21 | 7 | 3 | |
| 600 | 16 | 6 | 2.7 | 1585 |

Native graphite has a very high G/D ratio. Graphite ground, to amorphous powder has the G/D ratio. The material of the instant invention, starts high and tends toward 2 the more the material is processed. Amorphous graphite also has a G peak red shift to 2000 cm$^{-1}$. The material, of the instant invention may have a small red shift, but from the quality of the data it is hard to determine. The very high-surface area and aspect, ratio confirms it is largely graphene nano-platelets.

Mechanically exfoliated graphene is distinct from ground, graphite, in that, it maintains the strong crystalline sp2 structure. As graphite is ground to amorphous, the ratio of G to D Raman lines tends to 2 and the G line red shifts from 1560 cm$^{-1}$ to 2000 cm$^{-1}$. The G peak is referred to as the graphene peak. The D peak referred to as the Disorder peak. The more graphite is ground, the more the G peak is reduced and the D peak is increased.

If the added particles are larger than the graphene, they are coated with graphene, and if they are about the same approximate size, a nano-composite forms. The nanocomposites are useful for producing electrodes, especially for battery and capacitor applications.

BRIEF DESCRIPTION OF THE DRAWINGS

FIG. 1 is a graph of battery performance of a Si/graphene (200-250 m$^2$/g, 100 minutes processing time).

THE INVENTION

Thus, in one embodiment, there is a process of dry milling particulate materials, wherein at least one of the particulate materials is a layered material, in the presence of a non-layered material, to obtain a composition wherein the layered material is exfoliated, and wherein the non-layered material is composited with the exfoliated material.

The exfoliated material has a particle size of 10 microns by 5 nm thick, or less. In addition, the dry milling is controlled by controlling the surface energy of the milling media in addition to controlling the hardness of the milling media.

In a second embodiment, that is a process of dry milling particulate materials, wherein at least one of the particulate materials is a layered material, in the presence of a particulate material selected from the group consisting of i. ceramic, ii. glass, and iii. quartz, to obtain a composition wherein the layered material, is exfoliated and wherein the particulate material is coated with the exfoliated material.

The exfoliated material has a particle size of 500 nanometers or less. In addition, the dry rail ling is controlled by controlling the surface energy of the milling media in addition to controlling the hardness of the milling media.

In a fourth embodiment, there is a composited product obtained by the first embodiment and a coated product obtained by the second embodiment.

DETAILED DESCRIPTION OF THE INVENTION

The graphene produced by the methods of this invention has a relatively narrow aspect ratio, greater than graphite. For this invention aspect ratios above 5 and below 200 are preferred and more preferred are aspect ratios above 10 and below 25.

The small, that is, 1 to 5 nanometers thick, and 50 to 100 nanometers diameter, high surface area (above 500 BET), medium aspect ratio graphene, is a unique size for coaling.

The metals useful in this invention are the metalloid silicon, and the metals tin, iron, magnesium, manganese, aluminum, lead, gold, silver, titanium, platinum, palladium, ruthenium, copper, nickel, rhodium, and alloys of any of the above.

The plastic milling media useful in this invention has a hardness on the Brinell Scale in the range of 3 to 100. The plastic milling media is selected from the group consisting essentially of polyacetals, polyacrylates, such as, for example, methylmethacrylate, polycarbonate, polystyrene, polypropylene, polyethylene, polytetrafluorethylene, polyethylenemide, polyvinyl chloride, polyamineimide, phenolics and formaldehyde-based thermosetting resins, and alloys of any of the plastics named.

The particulate metal oxides useful in this invention are metal oxides selected from silicon, tin, iron, magnesium, manganese, aluminum, lead, gold, silver, titanium, platinum, palladium, ruthenium, copper, nickel, rhodium, tungsten, cobalt, molybdenum, and alloys of any the above named metal oxides, wherein the metal and metal oxide particles have a size of 100 microns or less. Preferred are particle sizes of 10 microns or less, and most preferred are particle sizes of 5 microns or less.

Metal carbides, metal nitrides are useful in this invention, as well as non-layered materials.

Graphene useful in this invention is preferred to have a thickness of 5 nm or less.

EXAMPLES

Example 1

Two grams of natural graphite and 1 g of micron sized Si (1 to 4 um) were loaded into a 65 ml stainless steel grinding container and milled in the presence of 24 g of polymethylmethacrylate balls. The polymethylmethacrylate balls consisted of two different sizes, namely, ¼ inches and ⅜ inches in diameter. The high energy milling machine was operated at <1500 rpm and its clamp speed was 1060 cycle/min. The polymethylmethacrylate balls can be replaced with polycarbonate, polystyrene, polypropylene, polyethylene, polytetrafluoroethylene, polyethyleneimide, polyvinylchloride and polyamide-imide to control milling efficiency, graphene size, porosity distribution and surface area at a fixed milling time, contact quality between Si and graphene surface. The surface area of the Si/graphene composite produced can be varied from 100 $m^2/g$ to 700 $m^2/g$ depending on milling time (60 to 500 min.) and Si/graphene composition and type of bail materials.

The result for the battery performance of a Si/graphene (200 to 250 $m^2/g$, 100 min. processing) sample as an anode for a lithium ion battery is plotted infra. The Si/graphene shows high capacity (>800 mAh/g, electrode loading) over 35 cycles at 100 mA/g, which supports the low cost, simple, time-saving, environmentally benign, flexible way to produce high performance graphene-based composite materials for energy applications. Some fluctuation of the capacity is due to the variation of temperature.

Example 2

Two grams of natural graphite and 1 g of nano sized metal oxides ($Fe_2O_3$, NiO, $CoO_3$, $MnO_3$) were loaded in a 65 ml stainless steel grinding container and nailed in the presence of 24 g of polymethylmethyacrylate balls. The products can be used as anode materials for lithium batteries and electrodes for supercapacitors.

What is claimed is:

1. A process of dry milling particulate materials, said process comprising:
   loading at least one layered particulate material into a grinding container;
   loading a non-layered particulate material into the grinding container; and
   milling the particulate materials with a plastic milling media having a Brinell hardness of 3 to 100 inside the grinding container;
   wherein said milling exfoliates the at least one layered particulate material to obtain an exfoliated material having a particle size of 10 microns or less by 5 nm thick or less; and
   wherein said milling composites the non-layered particulate material with the exfoliated material.

2. The process as claimed in claim 1 wherein the non-layered material is selected from the group consisting essentially of:
   i. a particulate metal and,
   ii. a particulate metal oxide.

3. The process as claimed in claim 2 wherein the particulate metals are selected from the group consisting essentially of:
   i. silicon,
   ii. tin,
   iii. iron,
   iv. magnesium,
   v. manganese,
   vi. aluminum,
   vii. lead,
   viii. gold,
   ix. silver,
   x. titanium,
   xi. platinum,
   xii. palladium,
   xiii. ruthenium,
   xiv. copper,
   xv. nickel,
   xvi. rhodium, and,
   xvii. alloys of any of i. to xvi.

4. The process as claimed in claim 2 wherein the particulate metal oxides are selected from the group consisting essentially of oxides of:
   i. silicon,
   ii. tin,
   iii. iron,
   iv. magnesium,
   v. manganese,
   vi. aluminum,
   vii. lead,
   viii. gold,
   ix. silver,
   x. titanium,
   xi. platinum,
   xii. palladium,
   xiii. ruthenium,
   xiv. copper,
   xv. nickel,
   xvi. rhodium, and
   xvii. alloys of any of i. to xvi.

5. The process as claimed in claim 1 wherein the layered material is graphite.

6. The process as claimed in claim 1 wherein the milling media has a surface energy essentially equivalent to the surface energy of the layered material.

7. The process as claimed in claim 1 wherein the exfoliated material has an aspect ratio of greater than about 25.

8. The process as claimed in claim 1 wherein the exfoliated material has an aspect ratio of from 5 to 200.

9. The process as claimed in claim 1 wherein the exfoliated material has a size in the range of from 50 nm to 10 microns.

10. The process as claimed in claim 1 wherein the exfoliated material has a thickness of from 1 nm to 5 nm.

11. The process as claimed in claim 1 wherein the plastic is selected from the group consisting essentially of:
   i. polymethylmethacrylate,
   ii. polycarbonate,
   iii. polystyrene,
   iv. polyethylene,
   v. polyethylene,
   vi. polytetrafluorothylene,
   vii. polyethyleneimide,
   viii. polyvinylchloride,
   ix. polyamine-imide, and,
   x. alloys of any of i. to ix.

12. The process as claimed in claim 1 wherein the particulate non-layered material has a size less than 100 microns.

13. The process as claimed in claim 1 wherein the particulate are metal carbides.

14. The process as claimed in claim 1 wherein the particulate materials are metal nitrides.

* * * * *